United States Patent Office 2,988,340
Patented June 13, 1961

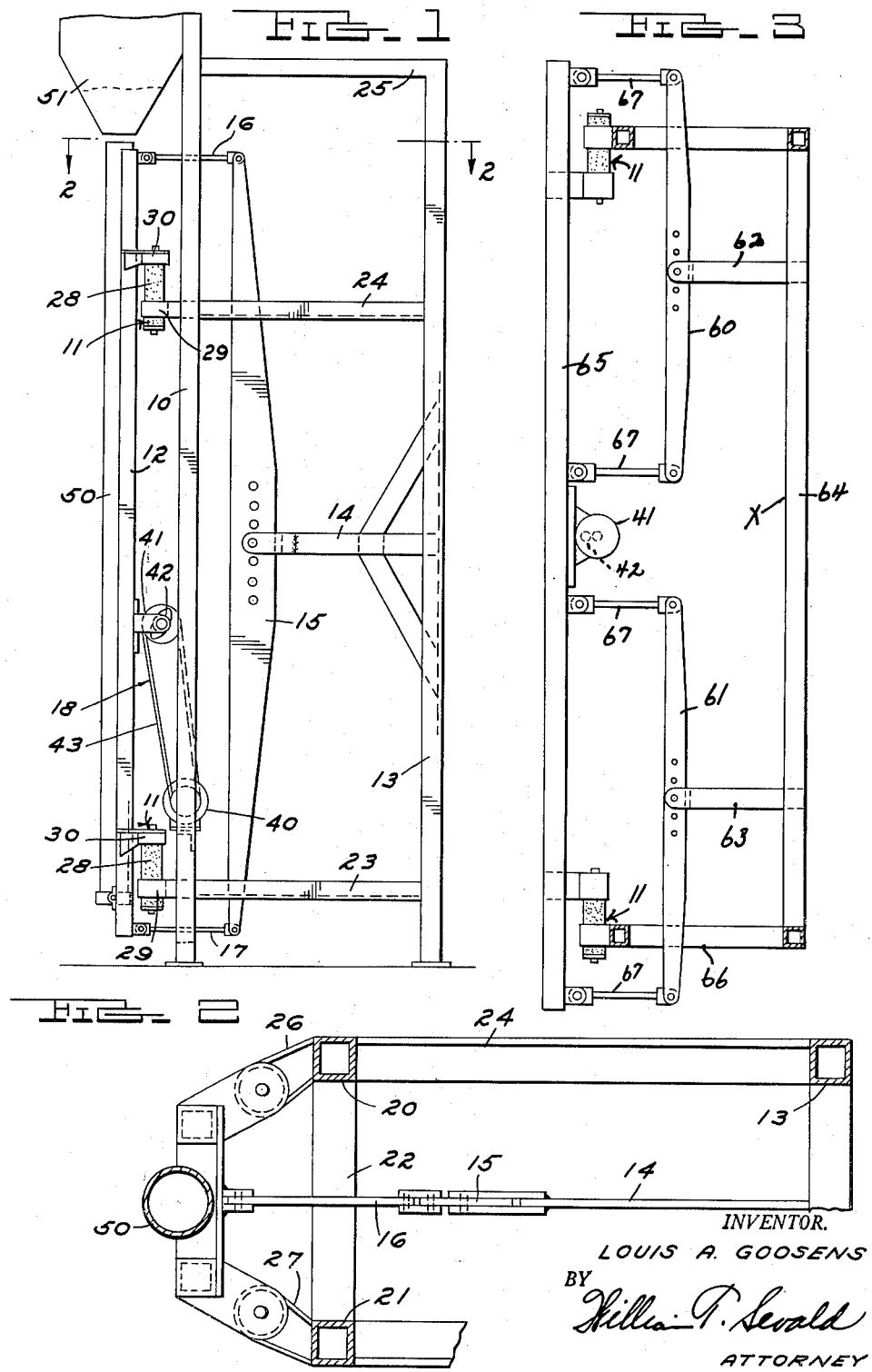

2,988,340
VIBRATING MACHINES
Louis A. Goosens, 22400 Shafer, Mount Clemens, Mich.
Filed Apr. 3, 1959, Ser. No. 803,990
8 Claims. (Cl. 259—72)

This invention relates to vibrating machines and more particularly pertains to improvements in conjunction therewith to prevent the vibrating frame or table from hunting points of oscillation or pivoting so as to maintain the frame or table vibration substantially uniform over its entire area. This application is a continuation in part of my copending application Serial No. 464,543, filed October 25, 1954 now U.S. Patent No. 2,896,297.

Vibration machines have been employed heretofore for compacting plastic materials in forms such as concrete blocks and posts, however, the several devices of the prior art have not proved entirely satisfactory inasmuch as they are complicated in design and construction, expensive to manufacture, difficult to use, and when employed in conjunction with forms which are much longer than they are wide, the machines oscillate and/or pivot on dynamic points thereby reducing the vibration motion at the points and increasing the vibration motion remote from the points which results in an uneven compaction of the plastic material desired to be compacted evenly in the form.

With the foregoing in view, the primary object of the invention is to provide a vibration machine which is simple in design and construction, inexpensive to manufacture, easy to use, and which is compensated against hunting points of dynamic pivoting, and/or oscillation so as to maintain the vibrating portion of the machine with substantially equal force characteristics over its entire area so that long objects such as fence posts and telephone poles made on the machine out of concrete will be compacted uniformly over their entire length so as to have even strength characteristics.

An object of the invention is to provide a vibration machine with substantially even vibration force characteristics so that long objects like fence posts and telephone poles can be evenly compacted thereon.

An object of the invention is to provide a suspension structure having resilient supports for movably supporting the vibrating frame or table.

An object of the invention is to provide an anchor adjacent the suspension means and vibration table for the purpose of supporting the reaction bar and links relative to the vibration table or frame.

An object of the invention is to provide a reaction bar relative to the vibration frame or table.

An object of the invention is to provide pivotally or movable connected links between the reaction bar and the vibration frame or table so that the frame can vibrate relative to the reaction bar via the flexibility of the link connections and wherein the reaction bar prevents the vibration table from hunting dynamic points about which to vibrate.

An object of the invention is to provide as many reaction bar and links length as necessary to cover the lineal extent of a vibration table with the reaction bars being fixed singly or in combination.

An object of the invention is to provide adjusting means between the anchor means and the reaction bars for adjusting the points of anchor support relative to the reaction bar to change the reaction characteristics thereof relative to the vibration table so as to make the device adjustable relative to the table.

These and other objects of the invention will become apparent by reference to the following description of a vibrating machine having a compensating assembly for preventing hunting for dynamic points of vibration embodying the invention taken in connection with the accompanying drawing in which:

FIG. 1 is a side elevational view of the inventive device including a concrete post form and feeding hopper showing a single compensating bar.

FIG. 2 is a cross sectional view of FIG. 1 taken on the line 2—2 thereof; and

FIG. 3 is a view similar to FIG. 1 showing multiple compensating bar device.

Referring now to the drawing wherein like numerals refer to like and corresponding parts throughout the several views, the vibrating machine disclosed therein to illustrate the invention comprises primary suspension means or stanchions 10 having resilient holders 11 mounted thereon, a vibrating frame or table 12 mounted on the holders 11, an anchor or base 13 having an arm 14 pivotally or movably connected to the compensating bar 15, links 16 and 17 pivotally or movably connected to the bar 15 and also pivotally or movably connected to the vibrating frame or table 12, and vibrating means 18 connected to the frame 12 for imparting vibration forces thereto.

More particularly the primary suspension means 10 comprises stanchions 20 and 21 which are cross-connected by the braces 22 relative to each other and which are connected to the anchor base 13 via the braces 23, 24, and 25 and it is to be noted that the braces 23 and 24 extend forwardly-outwardly of the stanchions 20 and 21 in supporting arms 26 and 27 which constitute projecting frame supports and upon which rest the resilient rubber cushions 28. Each resilient support means 11 comprises the resilient cushions 28 and receiving cups 29 on the arms 26 and 27, receiving cups 30 mounted on the vibrating frame or table 12, and bolts and nuts interconnecting the cup and cushions together so as to form a resilient support for the movable vibrating table relative to the non-vibrating suspension structure.

The vibrating means 18 comprises a motor 40 mounted on the suspension means 10 and a pulley and shaft 41 rotatably mounted on the frame or table 12 and at least one eccentric weight 42 mounted on the shaft so that when the motor 40 drives the pulley and shaft 41 via the belt 43, the weight or weights 42 vibrate the frame or table 12.

However, when forces are directed to a moving article it is found that the article hunts in its motion certain dynamic centers of pivotal movement or oscillation and this hunting is accentuated upon extension of the table in a lineal direction.

In other words, in making a substantially cubic concrete block this hunting would not be as noticeable as in the manufacture of an extremely elongated concrete fence post or telephone pole.

To prevent the vibrating table hunting points about which it can dynamically attempt to balance itself, the invention provides the compensating bar 15 connected adjacent either end of the vibrating frame 12 so that the attempted accentuated forces at the extremities is reduced by the connection via the links 16 and 17 to the bar 15 thereby dampening the vibration of the extremities and forcing the vibrations back toward the center or middle portion of the vibration table 12.

The frame 12 carries the concrete form 50 and the hopper 51 is adapted to feed plastic concrete aggregate into the form 50 to be compacted. Upon the concrete in the hopper 51 being introduced to the form 50 the device is set in vibratory motion and the concrete is evenly compacted over the entire lineal extent of the form 50 to form an evenly compacted post.

Referring to FIG. 3 it will be noted that multiple compensating bars 60 and 61 are located at either end of the vibrating table or frame 65 and that each is pivotally mounted intermediate its length on arms 62 and 63 respectively which are in turn mounted on the anchor frame 64 with the table or frame 65 being resiliently supported on the mounting 11 with the anchor frame 64 and suspension structure 66 set on footings, not shown. The links 67 are pivotally or ball-jointedly connected between the ends of the compensating bars 61 and 62 and frame or table 65 a point substantially opposite the ends of the bars 60 and 61 and the links 67 are also pivotally or ball jointedly connected to the frame or table 65.

While not shown in the drawing FIG. 3, a central arm can be extended from the anchor frame as at X and a compensating bar connected between the bars 60 and 61 so as to compound the action of the bars relative to one another.

In operation when the form 50 is filled with concrete, the motor 40 drives the eccentric weight 42 whereby the table is substantially universally dynamically vibrated but such a body in motion tends to hunt a dynamic pivot or oscillation area or point which tends to reduce the amplitude of the vibration at the point or area and to increase the amplitude remote from the area or point. However this dynamic balancing tendency is counteracted and prevented by the fact that the compensating bar or bars is so located as to dampen and/or feed back excessive motion at or from the extremities toward the center or middle of the table or frame body wherein the dynamic balance area or point is located. Since the compensating bars necessitate the table end for end and in the middle making the same amplitude of vibrational movement, the table is confined to vibrating uniformly.

It has also been found that the frames 12 or 65 can be set in vibration when the form 50 is empty and the form then filled gradually permitting the concrete or other plastic mix to be compacted as poured without the additional weight at the bottom of the partially filled form throwing the table out of even vibration characteristics as the pendulating effect of the mix at the bottom of the form is off-set to the top by the compensating bar or bars.

Although but a single embodiment of the invention has been shown and described in detail it is obvious that many changes may be made in the size, detail, and arrangement of the various elements of the invention within the scope of the appended claims.

I claim:

1. A vibrating machine for substantially evenly compacting plastic aggregate in a form to the desired shape and solidity for at least partially hardening therein such as concrete posts, comprising a primary suspension structure including paired stanchions having projecting supports, resilient holder means positioned on said suspension structure projecting supports, a frame connected adjacent its ends to said resilient holder means for movement relative to said suspension structure, said projecting supports and said resilient holder means being located so as to connect with said frame at points on said frame spaced inwardly from the the ends of said frame with said resilient supports being spaced relative to one another so that said frame can move relative to said supports via said holders; on said frame, vibration means connected to said frame intermediate said resilient holder means for vibrating said frame relative to said suspension structure on said resilient holder means adapted to impart universal vibratory motion to said frame as much as possible; said frame under vibration tending to find a dynamic oscillation-pivot point about which to move in inertia and gravity resistance to the forces placed on said frame by said vibration means; an anchor adjacent said support structure intermediate said frame, an arm extending from said anchor toward said frame, a bar movably connected to said arm and lying substantially parallel to said frame and links between said frame ends and said bar ends movably connected to both said bar and said frame; said bar and links intermediate said fixed anchor and said movable frame constituting reaction means relative to said frame under vibratory motion to prevent said frame oscillating and pivoting adjacent a dynamic point so as to maintain said frame in substantially equal vibratory motion force over its entire length to evenly compact aggregate contained in a form fixed on said frame.

2. In a device as set forth in claim 1, a plurality of reaction bars and links movably connected to said frame on one side and fixedly anchored on the other side, said bars having outer ends connected via said links to said frame outer ends; said bars having inner ends connected via said links to said frame intermediate its ends adjacent said vibration means.

3. In a device as set forth in claim 1, an aggregate form fixed on said frame for containing aggregate to be compacted to the desired form.

4. A vibrating machine for substantially evenly compacting plastic aggregate in a form to the desired shape and solidity, comprising a primary suspension structure having projecting frame supports, resilient holder means on said suspension structure projecting supports, a frame connected adjacent its ends to said resilient holder means for movement relative to said suspension structure, said projecting supports and said resilient holder means being located so as to connect with said frame at points on said frame spaced inwardly from the ends of said frame with said resilient supports being spaced relative to one another so that said frame can move relative to said supports via said holders; on said frame, vibration means connected to said frame intermediate said resilient holder means for vibrating said frame; said frame under vibration tending to hunt a dynamic oscillation-pivot point about which to move thereby causing concentration and voids of vibrational forces; an anchor adjacent said support structure intermediate said frame, a bar lying substantially parallel to said frame and connected to said anchor, and links between said frame ends and said bar ends movably connected to both said bar and said frame; said bar and links intermediate said fixed anchor and said movable frame constituting a reaction means relative to said frame under vibratory motion to prevent said frame finding oscillating and pivoting dynamic points so as to maintain said frame in substantially equal vibratory motion force over its entire length to evenly compact aggregate contained in a form fixed on said frame.

5. In a device as set forth in claim 1, a plurality of reaction bars and links movably connected to said frame on one side and fixedly anchored on the other side; said bars having outer ends connected via said links to said frame outer ends; said bars having inner ends connected via said links to said frame intermediate its ends adjacent said vibration means.

6. In a device as set forth in claim 1, an aggregate form fixed on said frame for containing aggregate to be compacted to the desired form.

7. A vibrating machine for substantially evenly maintaining vibratory forces over its vibrating frame portion so as to prevent the reduction of forces at dynamic oscillation or pivot points and the increase of forces remote from said points, comprising a suspension structure having projecting frame supports, resilient holders on said suspension structure projecting supports, a frame resiliently mounted adjacent its ends on said holders, said supports and said resilient holders being located so as to connect with said frame at points on said frame spaced inwardly from the ends of said frame with said resilient holders being spaced from one another so that said frame can move relative to said supports via said holders; vibration means connected to said frame intermediate said resilient holders for vibrating said frame on said resilient holders relative to said suspension structure; said frame tending to hunt dynamic oscillation or pivot points in resistance to the vibration forces imparted to said frame by said means thereby tending to reduce motion at the points and to increase motion remote from the points whereby the vibration forces tend to become unevenly distributed over said frame area; an anchor intermediate said frame ends adjacent said suspension means, a compensation bar pivotally mounted on said anchor and lying substantially parallel to said frame, and links lying between said bar and frame ends having one end pivotally connected to said compensation bar and having another end pivotally connected to said frame ends; said bar and links intermediate said fixed anchor and movable frame constituting reaction means relative to said frame under vibratory motion preventing said frame arriving at dynamic oscillation and pivot points so as to maintain said frame in substantially equal vibratory motion force over its entire area.

8. A vibrating machine for substantially evenly imparting vibratory forces over its vibrating frame portion so as to prevent the reduction of forces at dynamic oscillation or pivot points and the increase of forces remote from said point comprising a suspension structure having frame supports, resilient holders on said suspension structure frame supports, a frame having ends resiliently movably mounted adjacent its ends on said holders, said supports and said resilient holders being located so as to connect with said frame at points on said frame spaced inwardly from the ends of said frame with said resilient holders being spaced from one another so that said frame can move relative to said supports via said holders; vibration means connected to said frame intermediate said supports and holders for vibrating said frame on said resilient holders relative to said suspension structure; said frame tending to hunt dynamic oscillation or pivot points in resistance to the vibration forces imparted to said frame by said means thereby tending to reduce motion at the points and to increase motion remote from the points whereby the vibration forces tend to become unevenly distributed over said frame area; an anchor intermediate said frame ends adjacent said suspension means, a compensation bar movably mounted on said anchor and lying substantially parallel to said frame, and links lying between said bar and frame ends having one end movably connected to said compensation bar and having another end movably connected to said frame ends; said bar and links intermediate said fixed anchor and movable frame constituting reaction means relative to said frame under vibrator motion preventing said frame finding dynamic oscillation and pivot points so as to maintain equal vibratory motion force over the entire area of said frame.

References Cited in the file of this patent
UNITED STATES PATENTS

| | | |
|---|---|---|
| 2,545,029 | Hemb | Mar. 13, 1951 |
| 2,555,688 | Flam | June 5, 1951 |
| 2,610,040 | Elmmons | Sept. 9, 1952 |

FOREIGN PATENTS

| | | |
|---|---|---|
| 745,681 | France | Feb. 21, 1933 |
| 922,389 | France | Jan. 27, 1947 |